United States Patent
Shih et al.

(10) Patent No.: US 11,282,483 B2
(45) Date of Patent: Mar. 22, 2022

(54) FULL-SCREEN DISPLAYS

(71) Applicant: Hewlett-Packard Development Company, L.P., Spring, TX (US)

(72) Inventors: Chen Wen Shih, Taipei (TW); Tim Guynes, Spring, TX (US); John W. Frederick, Spring, TX (US); Timothy G. Solomon, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,356

(22) PCT Filed: Apr. 27, 2018

(86) PCT No.: PCT/US2018/029912
§ 371 (c)(1),
(2) Date: Sep. 28, 2020

(87) PCT Pub. No.: WO2019/209331
PCT Pub. Date: Oct. 31, 2009

(65) Prior Publication Data
US 2021/0035537 A1    Feb. 4, 2021

(51) Int. Cl.
*G09G 5/391* (2006.01)
*G06F 3/14* (2006.01)
*G09G 5/14* (2006.01)

(52) U.S. Cl.
CPC ........... *G09G 5/391* (2013.01); *G06F 3/1423* (2013.01); *G09G 5/14* (2013.01);
(Continued)

(58) Field of Classification Search
CPC .. G09G 5/391; G09G 5/14; G09G 2340/0407; G09G 2340/0442;
(Continued)

(56) References Cited

U.S. PATENT DOCUMENTS

2004/0263686 A1   12/2004   Kim
2005/0001931 A1*   1/2005   Kahn ................... H04N 7/0122
                                                                  348/556
(Continued)

OTHER PUBLICATIONS

LG 43" Class 4K UHD IPS LED Monitor (42.5 Diagonal), LG Canada, Feb. 19, 2018, 22 pgs http://www.lg.com/ca_en/desktop-monitors/lg-43UD79-B-4k-uhd-led-monitor.
(Continued)

*Primary Examiner* — Jennifer Mehmood
*Assistant Examiner* — Kim Thanh T Tran
(74) *Attorney, Agent, or Firm* — Rahman LLC

(57) ABSTRACT

An example display device includes a first graphics input port to receive a first video signal, and a second graphics input port to receive a second video signal. A processor is provided to select extended display identification data (EDID) information associated with the display device, and change the EDID information of a full-screen resolution of the first and second video signals while a split screen output command is generated. A video scaler is provided to generate a split screen output with a full-screen display for both the first and second video signals based on the changed EDID information.

20 Claims, 10 Drawing Sheets

(52) U.S. Cl.
CPC .............. *G09G 2340/0407* (2013.01); *G09G 2340/0442* (2013.01); *G09G 2360/18* (2013.01); *G09G 2370/20* (2013.01)

(58) Field of Classification Search
CPC ........... G09G 2360/18; G09G 2370/20; G09G 2310/0221; G09G 2370/042; G09G 5/005; G09G 5/363; G06F 3/1423
USPC ....................................................... 345/428
See application file for complete search history.

(56) References Cited

U.S. PATENT DOCUMENTS

| | | | |
|---|---|---|---|
| 2013/0063503 A1* | 3/2013 | Ryu ....................... | G09G 5/005 345/698 |
| 2016/0261923 A1 | 9/2016 | Huang et al. | |
| 2016/0299683 A1 | 10/2016 | Kwon et al. | |
| 2016/0323544 A1* | 11/2016 | Wang ....................... | H04N 7/15 |
| 2019/0035354 A1* | 1/2019 | Cheng .................... | G09G 5/005 |

OTHER PUBLICATIONS

ViewSonic, MultiPicture Functionality, 2 pgs.
AOC Monitor, Q2963PM, Feb. 19, 2018, 7 pgs http://www.aocmonitorap.com/au/product_display.php?id=408.

* cited by examiner

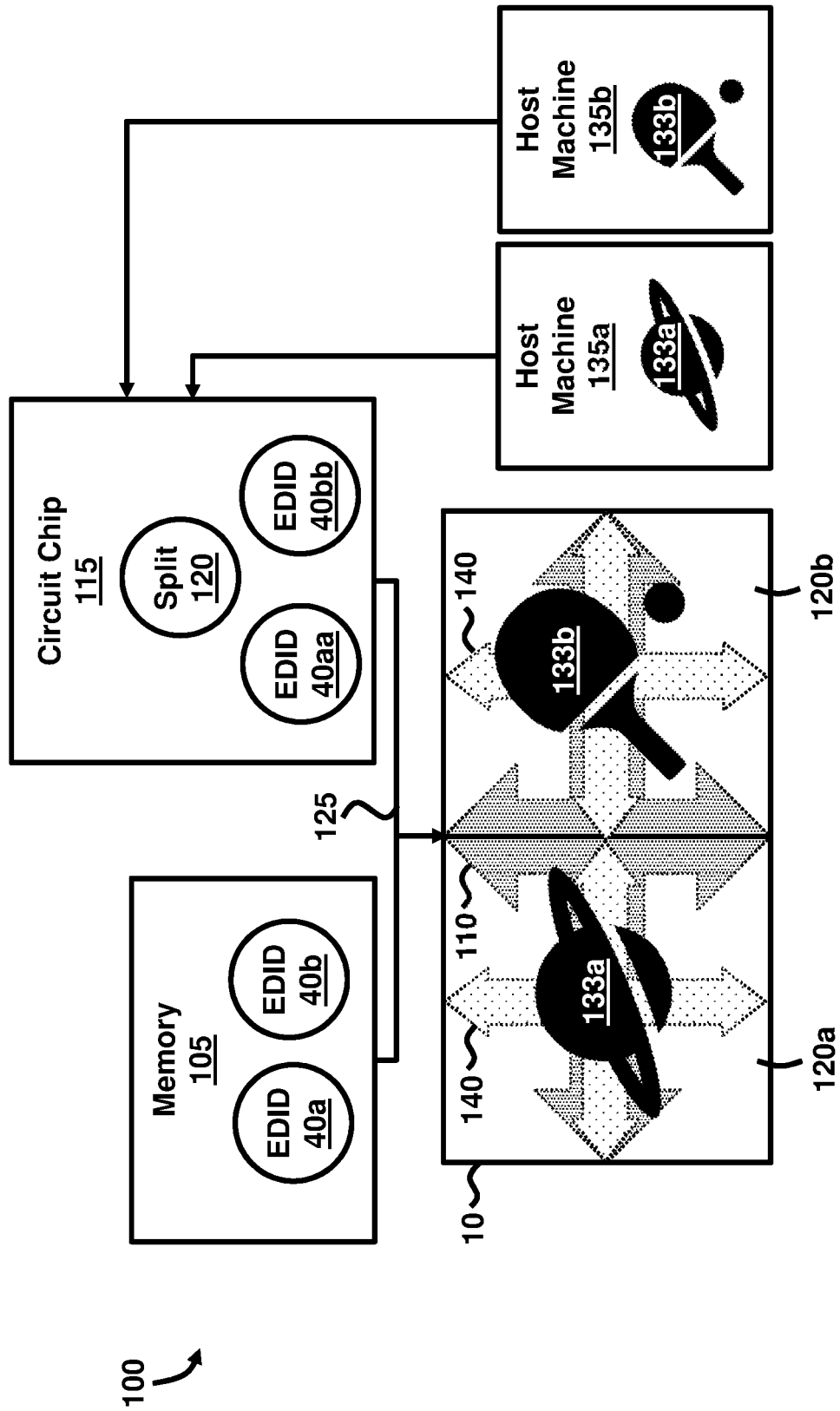

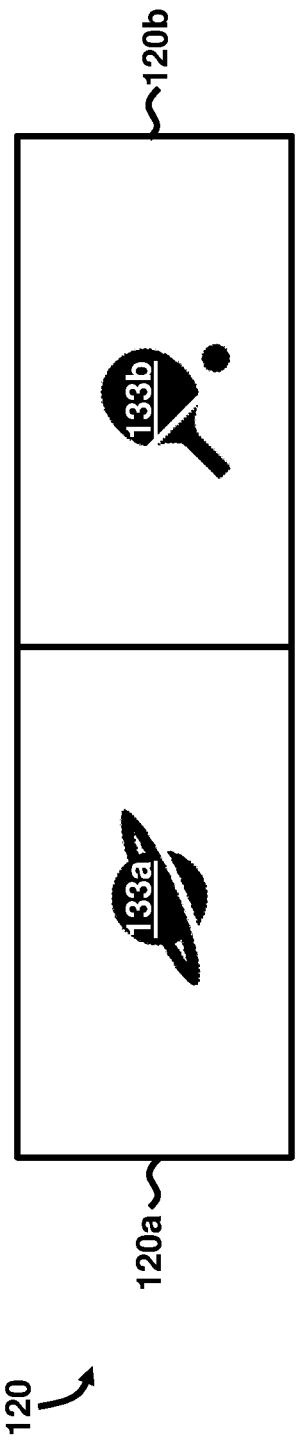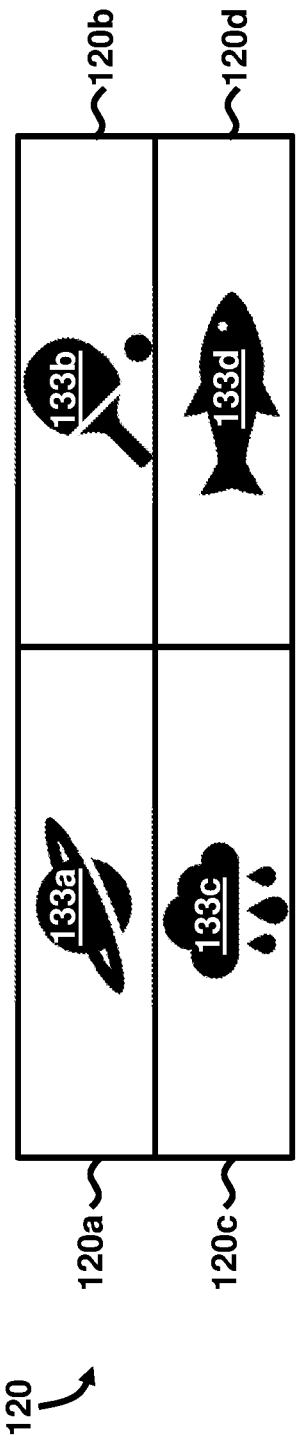

FULL-SCREEN DISPLAYS

BACKGROUND

Electronic devices such as computers have display screen of various sizes. Different types of graphics are output on display screens. The size of the graphics can be altered based on a user's preference.

BRIEF DESCRIPTION OF THE DRAWINGS

The following detailed description references the drawings, in which:

FIG. 6A is a block diagram illustrating a system to split the screen output of a display device, according to an example.

FIG. 9 is a block diagram illustrating two output displays associated with a split screen output, according to an example.

FIG. 10 is a block diagram illustrating four output displays associated with a split screen output, according to an example.

Figure 1:
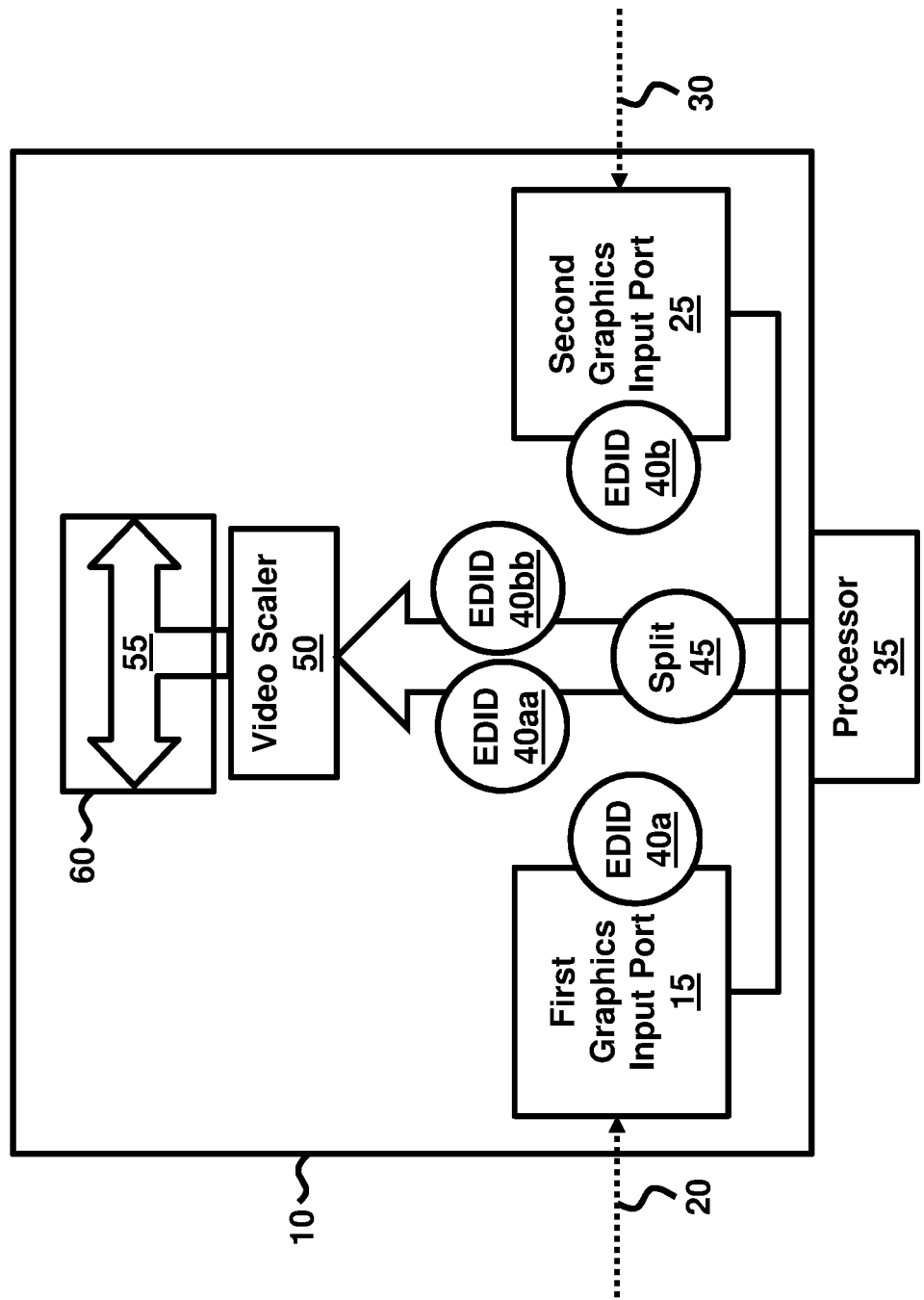
FIG. 1 is a block diagram illustrating a display device, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Display screens may be set to output graphics from multiple input sources simultaneously. This multiple output mode may be referred to as a picture-in-picture or picture-by-picture (PiP/PbP) feature where the different graphics streams are positioned side-by-side on the display screen. Users often desire a widescreen display in order to allow full coverage/output of the graphics. In fact, the widescreen display may be better suited to output the graphics particularly for video displays such as movies, which are often filmed or processed in a widescreen format. In order for the graphics to be displayed in the PiP/PbP format on a display screen, the output often results in large areas of the display screen that contain no graphics; e.g., are simply blank or black areas of the screen. Such blank/black areas are often in the form of elongated bars at the top and bottom of the display screen, and which extend the entire width of the display screen. However, this type of graphics output diminishes the viewing quality for the user.

In order to address this, the examples described below provide a technique to control the display scaling/aspect ratio by eliminating the empty/black bar at the top and bottom of a display screen when a PiP/PbP mode is selected due to multiple image sources transmitting display data to a single display screen/monitor. In some examples, the display device adds an additional EDID information in erasable programmable read-only memory (EPROM) or flash memory, and then the display reloads the EDID information, which triggers the host device to read a corrected/different EDID resolution associated with a PiP/PbP feature enabled. This causes the screen to display the correct aspect ratio and eliminate the upper/lower black bars from the screen. As used herein, the EDID information associated with the display device refers to metadata related to the parameters and/or capabilities of a source device of video signals, such as the resolution data, refresh rate data, and/or display mode data of the display device.

According to an example, a display device includes a first graphics input port to receive a first video signal; a second graphics input port to receive a second video signal; a processor to select EDID information associated with the display device, and change the EDID information of a full-screen resolution of the first and second video signals while a split screen output command is generated; and a video scaler to generate a split screen output with a full-screen display for both the first and second video signals based on the changed EDID information. The video scaler may be an electronic device that processes the first and second video signals by scaling each of the first video signal and second video signal for display on the display device. The first and second video signals may include graphics data, and the video scaler is to scale the graphics data received by each of the first and second graphics input ports by changing an aspect ratio associated with the graphics data. The full-screen display for both the first and second video signals based on the changed EDID information may remove unused display areas from the split screen output. The changed EDID information may include half-screen resolution information. The first graphics input port may receive the first video signal from a first machine, and the second graphics input port may receive the second video signal from a second machine that is different from the first machine.

Another example provides a system including a memory to store EDID information associated with a display device. The EDID information includes capabilities for the display device to display graphics at a full-screen display resolution; and a circuit chip to enter into a split screen output mode for the display device to split an output into multiple output displays based on graphics received from multiple host machines; change the EDID information from a full-screen display resolution to a half-screen display resolution while in the split screen output mode; and generate the split screen output mode associated with graphics from the multiple host machines with a full-screen display resolution based on the changed EDID information. The memory may include any of a read-only memory and a flash memory. The system may include a frame buffer in the system to store the graphics from the multiple host machines. The split screen output mode may include at least two output displays. The split screen output mode may include four output displays in another example. The circuit chip may include a video scaler to convert a first display resolution into a second display resolution.

FIG. 1 is a block diagram illustrating an example display device 10 including a first graphics input port 15 to receive a first video signal 20, and a second graphics input port 25 to receive a second video signal 30. In some examples, the display device 10 may include a computer or television monitor, and may be a widescreen monitor, or any other type of display screen for viewing graphics. The first graphics input port 15 and second graphics input port 25 may be any type of input/output (I/O) computer port that are capable of receiving signals either through a direct connection with a cable or through wireless connection with the signal generating source. Furthermore, the first video signal 20 and the second video signal 30 may be either wireless or wired signals. Moreover, the first video signal 20 and the second video signal 30 may be electronic signals, optical signals, or magnetic signals, according to various examples. Additionally, the first video signal 20 and the second video signal 30 may be analog or digital signals, according to some examples. Additionally, the type of signal associated with the first video signal 20 may be the same as the type of signal associated with the second video signal 30, in one example, or the type of signal associated with the first video signal 20 may be different than the type of signal associated with the second video signal 30, in another example. Accordingly, the display device 10 may be arranged in any suitable format to receive the first video signal 20 and the second video signal 30 irrespective of the type of signals associated with the first video signal 20 and the second video signal 30.

The display device 10 further includes a processor 35 to select EDID information 40a, 40b associated with the display device 10, and change the EDID information 40a, 40b; e.g., into EDID information 40aa, 40bb, of a full-screen resolution of the first video signal 20 and second video signal 30 while a split screen output command 45 is generated. The processor 35 selects the EDID information 40a, 40b based on the particular dual output mode selected by a user. For example, a user may select a picture-in-picture mode or a picture-by-picture mode, and the processor selects the EDID information 40a, 40b based on the selected mode. In some examples, the processor 35 may be a central processing unit, microprocessor, controller, hardware engine, hardware pipeline, and/or other hardware-enabled device including volatile and non-volatile memory components suitable for receiving and processing the first video signal 20 and second video signal 30, and running non-transitory computer-executable instructions programmed or transmitted to the processor 35. The EDID information 40a, 40b associated with the display device 10 includes metadata related to the parameters and/or capabilities of the source, which is not shown in FIG. 1, of the first video signal 20 and second video signal 30. Moreover, the EDID information 40a, 40b as well as the changed EDID information 40aa, 40bb may include a variety of parameters or specifications that are supported by the display device 10. Some example specifications included in the EDID information 40a, 40b and the changed EDID information 40aa, 40bb are product name and type, display size, and supported timing modes. The EDID information 40a, 40b may be read, processed, and edited by the processor 35, according to an example. In some examples, the processor 35 changes the EDID information 40a, 40b into EDID information 40aa, 40bb by changing the resolution data, refresh rate data, and/or display mode data associated with the display device 10.

According to an example, the resolution of the display device 10 refers to the number of pixels in the width and height dimensions, which can be displayed on the display device 10. In a full-screen resolution, the first video signal 20 and second video signal 30 are encoded to provide a sufficient number of pixels capable of providing a display on the full screen; e.g., entire width and height of the display device 10. In examples, a full-screen resolution of the first video signal 20 and second video signal 30 is provided to display device 10 to allow graphics and/or video data contained in the first video signal 20 and second video signal 30 to be run at a full-screen resolution on the display device 10, which permits proper display of the graphics and/or video data on the display device 10. According to an example, the actual size; e.g., the number of pixels in the width and height dimensions, of the full-screen resolution may be determined by the display device 10. The processor 35 generates the split screen output command 45. In an example, the split screen output command 45 includes computer-executable instructions processed by the processor 35, which identifies that the graphics output; e.g., the image and/or video output, onto the display device 10 should be in a split screen mode. According to an example, the split screen mode refers to dividing the output displayed on the display device 10 from one full-screen output to multiple split screen outputs with corresponding separate graphics being output or displayed on each of the split screen outputs.

In examples, the display device 10 also includes a video scaler 50 to generate a split screen output 55 with a full-screen display 60 for both the first video signal 20 and second video signal 30 based on the changed EDID information 40aa, 40bb. The video scaler 50 scales each of the first video signal 20 and second video signal 30 to fit on half of the display device 10 regardless of the resolution or which EDID information 40a, 40b (e.g., full-screen or half-screen) is used. The video scaler 50 may be a digital device or a combined analog and digital device. In an example, the video scaler 50 may be a hardware-enabled device that converts the first video signal 20 and second video signal 30, which may be set at a first resolution, to a second and higher resolution in order to be formatted for split screen output 55 but at a full-screen display 60 using standard conversion or scaling techniques. In this regard, the split screen output 55 permits both the first video signal 20 and second video signal 30 to be output and the corresponding graphics to be viewable simultaneously on the display device 10. For example, the full-screen display 60 allows the corresponding graphics associated with the first video signal 20 and second video signal 30 to occupy a full length and width associated with the split screen size allotted for the particular first video signal 20 or the second video signal 30. In other words, the full-screen display 60 removes any unused, blank, or black areas, etc. of the display device 10 while permitting the graphics output associated with the first video signal 20 and second video signal 30 to be displayed in a split screen output 55 by the display device 10 at the proper resolution. In this regard, the proper resolution refers to the resolution required to provide a clear graphics output on the display device 10 based on a predetermined clarity standard, which may be preprogrammed into the video scaler 50 or adjusted in real-time.

According to an example, the video scaler 50 determines that both the first video signal 20 and second video signal 30 are being input into the display device 10. In an example, the video scaler 50 further identifies that the graphics; e.g., the image and/or video output onto the display device 10 should be in a split screen mode. Both the first video signal 20 and second video signal 30 are processed by the video scaler 50 together with the EDID information 40a, 40b provided by the respective first video signal 20 and second video signal 30 in order to output the first video signal 20 and second video signal 30 by way of a dual or split output on the display device 10, according to an example. Additionally, the video scaler 50 may or may not process the first video signal 20 and second video signal 30 simultaneously and may process the first video signal 20 and second video signal 30 using the same or different signal processing techniques.

As such, in the example of FIG. 1, the display device 10 is shown having the first graphics input port 15 to receive the first video signal 20, and the second graphics port 25 to receive the second video signal 30. The processor 35 is provided to change the EDID information 40a, 40b, and the video scaler 50 is provided to generate the split screen output 55 based on the changed EDID information 40aa, 40bb. Additional details of the video scaler 50 are described next.

Figure 2:
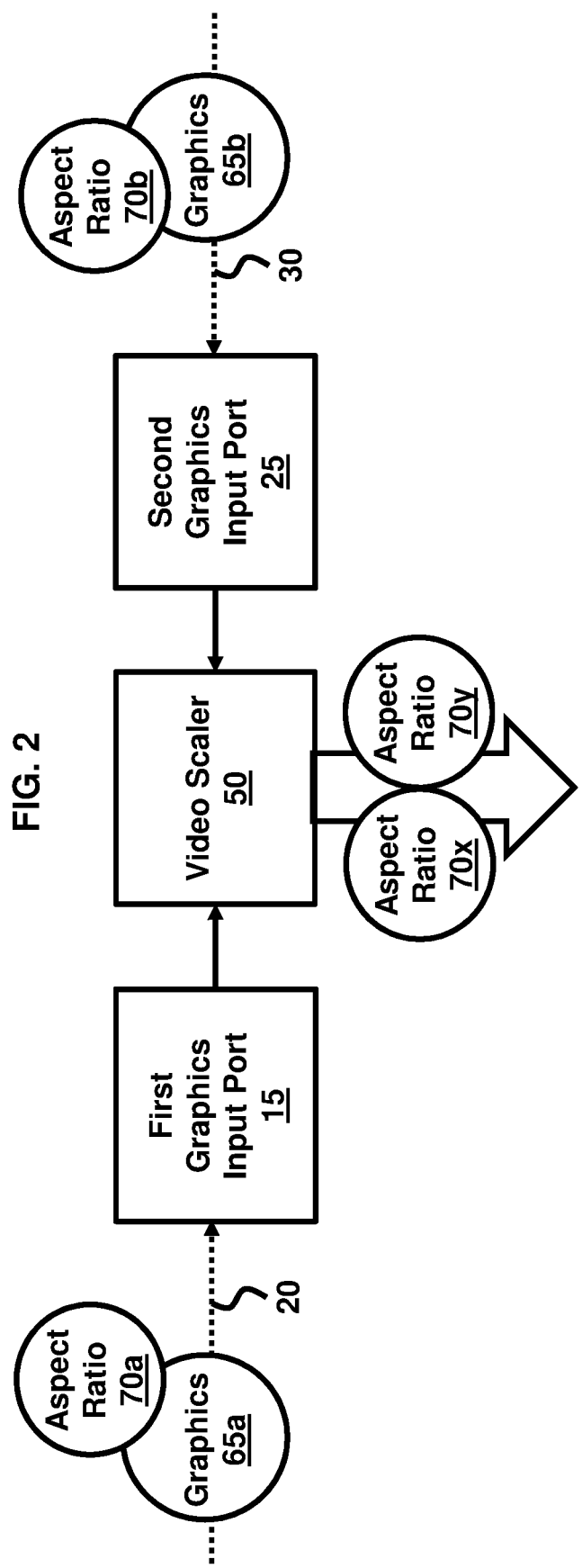
FIG. 2 is a block diagram illustrating the video scaler of the display device of FIG. 1, according to an example.

FIG. 2, with reference to FIG. 1, is a block diagram illustrating the video scaler 50 of the display device 10 of FIG. 1, according to an example. The block diagram of FIG. 2 further illustrates an example where the first video signal 20 and second video signal 30 include graphics data 65a, 65b. According to some examples, the graphics data 65a, 65b may include image data or video data. As shown in FIG. 2, the video scaler 50 scales the graphics data 65a, 65b received by each of the first graphics input port 15 and second graphics input port 25, respectively, by changing an aspect ratio 70a, 70b associated with the graphics data 65a, 65b; e.g., to aspect ratio 70x, 70y, respectively. The aspect ratio 70a, 70b refers to the ratio of the width to the height of the graphics being displayed on the display device 10. Accordingly, by using any of up-conversion, down-conversion, upscaling, and downscaling of the graphics data 65a, 65b, the aspect ratio 70a, 70b of the graphics data 65a, 65b may be changed to aspect ratio 70x, 70y, respectively. As such, scaling the graphics data 65a, 65b refers to changing the aspect ratio 70x, 70y associated with the graphics data 65a, 65b, respectively. In an example, the aspect ratio 70x may be the same as aspect ratio 70y. In other examples, the aspect ratio 70x may be different than aspect ratio 70y. According to an example, when the video scaler 50 performs the change in the aspect ratio; e.g., from aspect ratio 70a, 70b to aspect ratio 70x, 70y, respectively, then it may be performed using hardware elements associated with the video scaler 50. When the processor 35 performs the change in the aspect ratio; e.g., from aspect ratio 70a, 70b to aspect ratio 70x, 70y, respectively, then it may be performed by hardware elements of the processor 35 or non-transitory computer-executable instructions programmed in the processor 35, according to an example.

Accordingly, the first graphics input port 15 receives graphics data 65a, and the second graphics input port 25 receives graphics data 65b, in an example. The video scaler 50 is provided to scale the graphics data 65a, 65b by changing the respective aspect ratios 70x, 70y, according to an example. Scaling the graphics data 65a, 65b further affects the output presented on the display device 10 as further described below.

Figure 3:
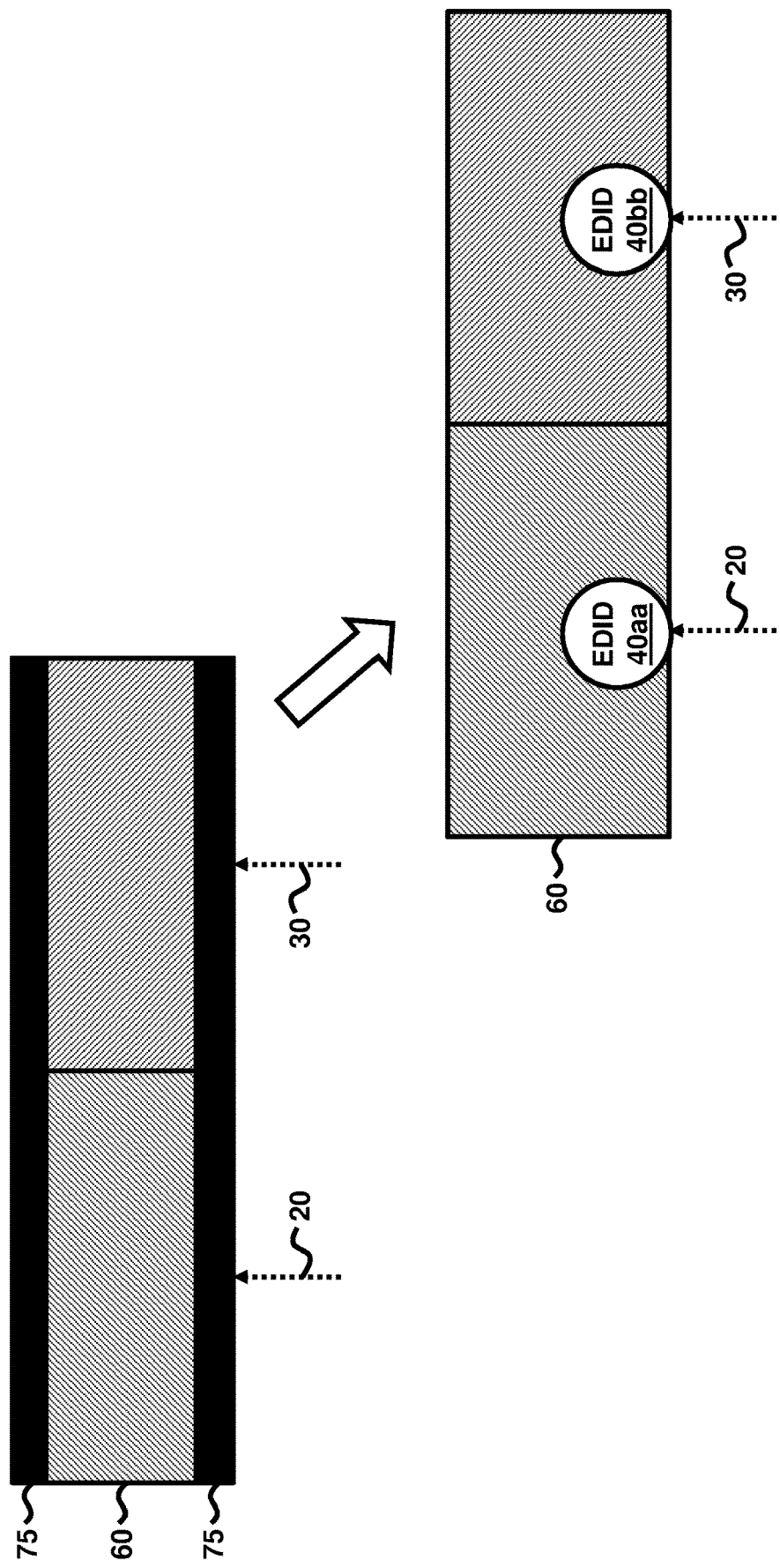
FIG. 3 is a block diagram illustrating removal of unused display areas from a split screen output displayed on the display device of FIG. 1, according to an example.

FIG. 3, with reference to FIGS. 1 through 2, is a block diagram illustrating removal of unused display areas 75 from a split screen output 55 displayed on the display device 10 of FIG. 1, according to an example. More particularly, FIG. 3 is a block diagram illustrating an example where the full-screen display 60 for both the first video signal 20 and second video signal 30 based on the changed EDID information 40aa, 40bb removes unused display areas 75 from the split screen output 55. In this regard, the unused display areas 75 may refer to blank or blacked-out areas of the display device 10, which typically exists in dual-display systems. However, the changed EDID information 40aa, 40bb, as described above, changes the screen resolution associated with the graphics data 65a, 65b to allow for the full-screen display 60 for the graphics data 65a, 65b associated with the first video signal 20 and second video signal 30, respectively, thereby removing the unused display areas 75 from the display device 10.

In accordance with the examples described above, the display device 10 is capable of providing a full-screen display 60 for both the first video signal 20 and the second video signal 30 due to the changed EDID information 40aa, 40bb. Moreover, as a result of providing the full-screen display 60, the unused display areas 75 are removed from the split screen output 55 of the display device 10. In other words, a split screen output 55 is displayed on the display device 10 without unused display areas 75 based on the changed EDID information 40aa, 40bb, thereby resulting in a full-screen display 60 in the split screen output 55. For example, if the split screen output 55 of the display device 10 results in two display outputs, then a full-screen display 60 is provided in each of the two display outputs. Additional aspects of the changed EDID information 40aa, 40bb are described below.

Figure 4:
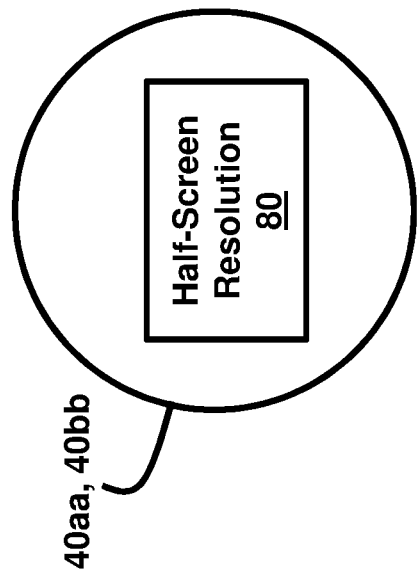
FIG. 4 is a block diagram illustrating exemplary contents of an extended display identification data (EDID) information, according to an example.

FIG. 4, with reference to FIGS. 1 through 3, is a block diagram illustrating exemplary contents of the EDID information 40a, 40b, according to an example. In the example of FIG. 4, the changed EDID information 40aa, 40bb includes half-screen resolution information 80. According to an example, the actual size of the half-screen resolution may be determined by the display device 10. The half-screen resolution information 80 contained in the changed EDID information 40aa, 40bb may allow the video scaler 50 to down-convert the first video signal 20 and second video signal 30 in order to provide a split screen output 55 by the display device 10, according to an example.

As such, the half-screen resolution information 80 may include computer-implemented instructions processed by the video scaler 50 in order to down-convert; e.g., reduce the frequency of, the first video signal 20 and second video signal 30. This down-conversion process permits the display device 10 to have split screen output 55 capabilities. Additional details regarding the first video signal 20 and second video signal 30 used to create the split screen output 55 are described next.

Figure 5:
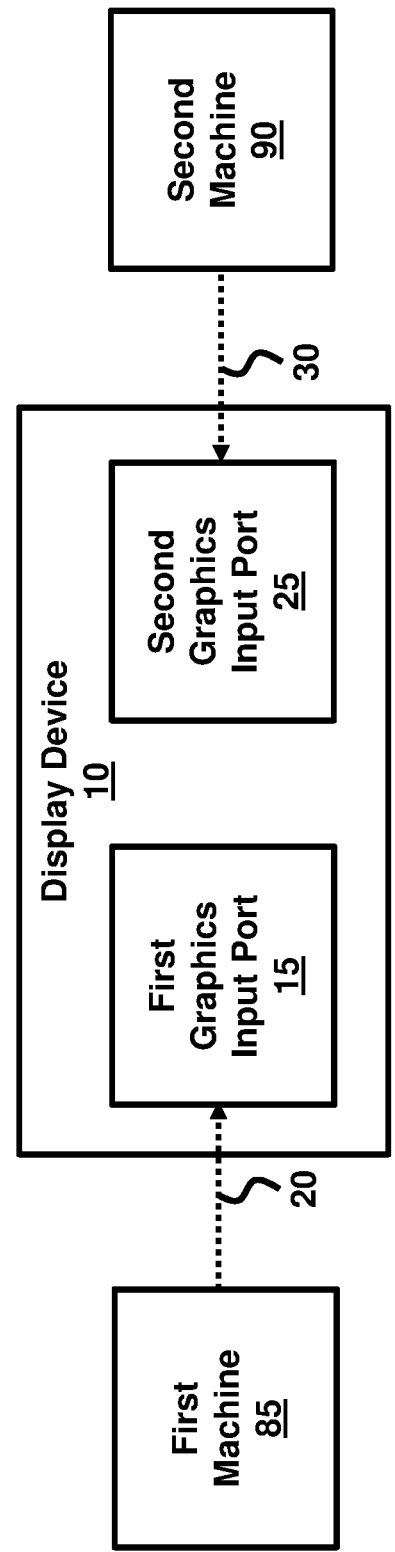
FIG. 5 is a block diagram of multiple machines to send video signals, according to an example.

FIG. 5, with reference to FIGS. 1 through 4, is a block diagram of multiple machines (e.g., first machine 85 and second machine 90) to send video signals (e.g., first video signal 20 and second video signal 30), according to an example. As shown in the example of FIG. 5, the first graphics input port 15 is to receive the first video signal 20 from a first machine 85, and the second graphics input port 25 is to receive the second video signal 30 from a second machine 90 that is different from the first machine 85. According to various examples, the first machine 85 and second machine 90, which serve as the aforementioned sources of the first video signal 20 and second video signal 30, respectively, may be desktop computers, laptop computers, servers, tablet devices, smartphones, television channel receivers, digital cameras, video cameras, video sensors, scanners, or other types of electronic devices that generate graphics data 65a, 65b and corresponding video signals;

e.g., first video signal 20 and second video signal 30 for transmission to the first graphics input port 15 and second graphics input port 25, respectively for processing and display on the display device 10.

In an example, the type of device constituting the first machine 85 may be the same as the type of device constituting the second machine 90. For example, both the first machine 85 and the second machine 90 may be laptop computers. In another example, the type of device constituting the first machine 85 may be different from the type of device constituting the second machine 90. For example, the first machine 85 may be a tablet device and the second machine 90 may be a smartphone. Accordingly, the display device 10 is provided to integrate with both the first machine 85 and the second machine 90 to provide the split screen output 55.

FIG. 6A, with reference to FIGS. 1 through 5, is a block diagram illustrating a system 100 to split the screen output of the display device 10, according to an example. The example system 100 may include a memory 105 to store EDID information 40a, 40b associated with a display device 10. The memory 105 may be any suitable type of memory device capable of storing data, and capable of having the stored data retrieved by other devices. Examples of the types of memory 105 which may be utilized are described below. The memory 105 may be embedded in the display device 10, operatively connected to the display device 10, or may be communicatively coupled to the display device 10. The EDID information 40a, 40b includes capabilities for the display device 10, which may be read by a graphics card, which is not shown, to display graphics 133a, 133b at a full-screen display resolution 110. In this regard, capabilities may refer to parameters, configurations, ratings, characteristics, etc. of the display device 10 to display the graphics 133a, 133b at a full-screen display resolution 110. According to an example, the resolution of the display device 10 refers to the number of pixels in the width and height dimensions, which can be displayed on the display device 10. In a full-screen display resolution 110, a sufficient number of pixels are provided, which are capable of providing a display on the full screen; e.g., entire width and height of the display device 10.

The graphics 133a, 133b may be generated by the graphics data 65a, 65b described above. However, with respect to system 100, the graphics 133a, 133b refers to the image or video that is output and displayed on the display device 10. The graphics 133a, 133b may be any type of graphics including images and videos, and the representations of the graphics 133a, 133b provided in the figures are merely example representations of graphics and are not limited to any particular type of graphics.

The system 100 further includes a circuit chip 115 to enter into a split screen output mode 120 for the display device 10 to split an output 125; e.g., an output signal, etc., into multiple output displays 120a, 120b based on graphics 133a, 133b received from multiple host machines 135a, 135b. The multiple output displays 120a, 120b may refer to having multiple areas of the display device 10 outputting graphics 133a, 133b. In an example, entering into the split screen output mode 120 refers to the circuit chip 115 changing its functional mode from a single output mode to a split screen output mode 120 based on switching of hardware elements contained in the circuit chip 115 or based on execution of non-transitory computer-implemented instructions programmed into the circuit chip 115.

The circuit chip 115 may be an integrated circuit chip, a field programmable gate array, or some other set of electrical circuits arranged to perform signal and/or data processing. The split screen output mode 120 allows dual graphics 133a, 133b to be displayed on the display device 10. More particularly, the split screen output mode 120 allows the display device 10 to be partitioned into the multiple output displays 120a, 120b on which the graphics 133a, 133b are displayed, respectively. The circuit chip 115 may be embedded in the display device 10 or may be operatively connected to the display device 10.

The host machines 135a, 135b, which serve as the aforementioned sources of the first video signal 20 and second video signal 30, respectively, may be desktop computers, laptop computers, servers, tablet devices, smartphones, television channel receivers, digital cameras, video cameras, video sensors, scanners, or other types of electronic devices that generate graphics 133a, 133b, respectively, for transmission to the circuit chip 115 for processing and then output 125; e.g., output as a signal, to the display device 10 for display on the display device 10. Accordingly, the circuit chip 115 is provided to integrate with multiple host machines 135a, 135b and enters into the split screen output mode 120 to provide the output 55 to the display device 10.

Additionally, the circuit chip 115 is provided to change the EDID information 40a, 40b; e.g., to EDID information 40aa, 40bb, from a full-screen display resolution 110 to a half-screen display resolution 140 while in the split screen output mode 120. In this regard, the circuit chip 115 utilizes up-conversion, down-conversion, upscaling, and downscaling techniques to change the resolution of the graphics 133a, 133b provided by the host machines 135a, 135b, respectively. Accordingly, in one example, the graphics 133a, 133b provided by the host machines 135a, 135b, respectively may be set to full-screen display resolution 110, and by changing the EDID information 40aa, 40bb, the circuit chip 115 is provided to change the resolution of the graphics 133a, 133b to be displayed on the display device 10 to a half-screen display resolution 140; i.e., for display on the multiple output displays 120a, 120b of the display device 10. As such, the circuit chip 115 is provided to generate the split screen output mode 120 associated with graphics 133a, 133b from the multiple host machines 135a, 135b with a full-screen display resolution 110 based on the changed EDID information 40aa, 40bb. In this regard, according to some examples, generating the split screen output mode 120 may refer to selective switching of digital logic components in the circuit chip 115 or execution of non-transitory computer-implemented instructions processed by the circuit chip 115 resulting in the circuit chip 115 entering into the split screen output mode 120. Another example of the system 100 is described below in accordance with FIG. 6B.

Figure 6B:
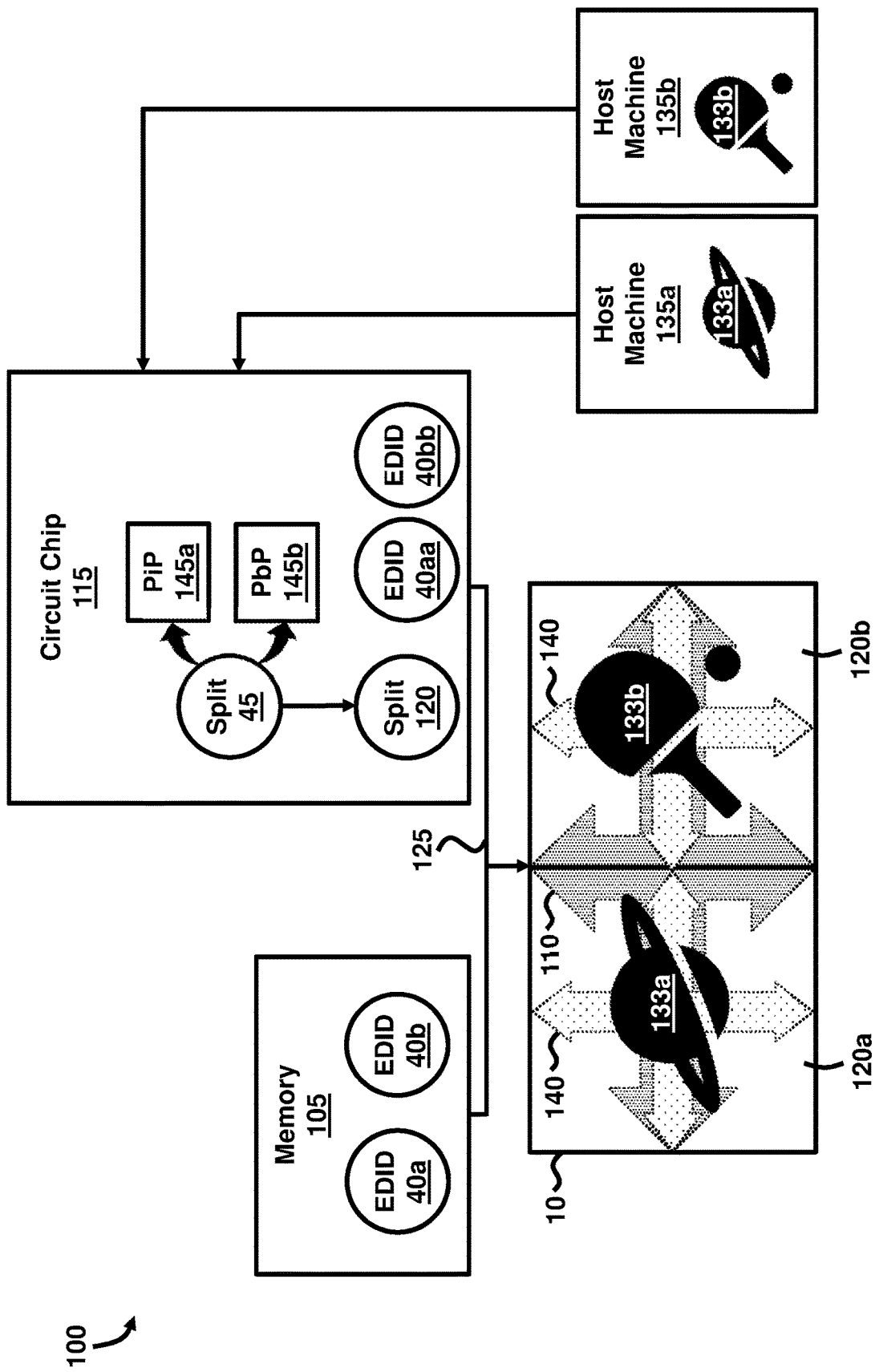
FIG. 6B is a block diagram illustrating the system of FIG. 6A to split the screen output of a display device, according to another example.

FIG. 6B, with reference to FIGS. 1 through 6A, is a block diagram illustrating the system 100 of FIG. 6A to split the screen output of the display device 10, according to an example. In the example of the system 100 in FIG. 6B, the split screen output mode 120 is generated based on the split screen output command 45 programmed or transmitted to the circuit chip 115. In some examples, the split screen output command 45 may include any of a picture-in-picture output command 145a and a picture-by-picture output command 145b. In the picture-in-picture output command 145a, the resulting multiple output displays 120a, 120b may be arranged such that one of the displays; e.g., 120b, for example, is displayed from within the other display; e.g., 120a, for example, and vice versa. In the picture-by-picture output command 145b, the resulting multiple output displays 120a, 120b are arranged to be side-by-side, or otherwise adjacent to one another.

Accordingly, FIGS. 6A and 6B depict a picture-by-picture output display 120a, 120b, as an example, for illustrative purposes. However, the system 100 is equally capable of providing a picture-by-picture output display. Next, the memory 105 of the system 100 is described in further detail below by way of illustrative examples.

Figure 7:
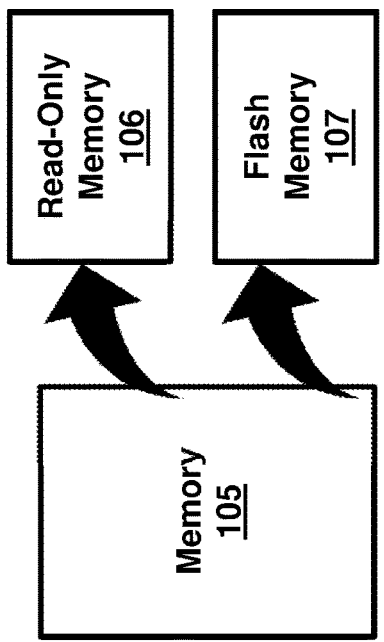
FIG. 7 is a block diagram illustrating exemplary configurations of the memory of the system of FIGS. 6A and 6B, according to an example.

FIG. 7, with reference to FIGS. 1 through 6B, is a block diagram illustrating exemplary configurations of the memory 105 of the system 100 of FIGS. 6A and 6B, according to an example. In an example, the memory 105 includes any of a read-only memory 106 and a flash memory 107. These are only two possible examples, and as such the memory 105 may be any suitable type of volatile or non-volatile memory device. According to various examples, the read-only memory 106 may include a programmable read-only memory (PROM), erasable programmable read-only memory (EPROM), or an electrically erasable programmable read-only memory (EEPROM) device. In some examples, the flash memory 107 may be a NOR flash memory device or a NAND flash memory device. As such, the memory 105 is not limited to any particular configuration or type of memory device, and may contain various components and hardware elements in order to provide suitable storage capabilities for storing the EDID information 40a, 40b as well as the changed EDID information 40aa, 40bb.

Figure 8:
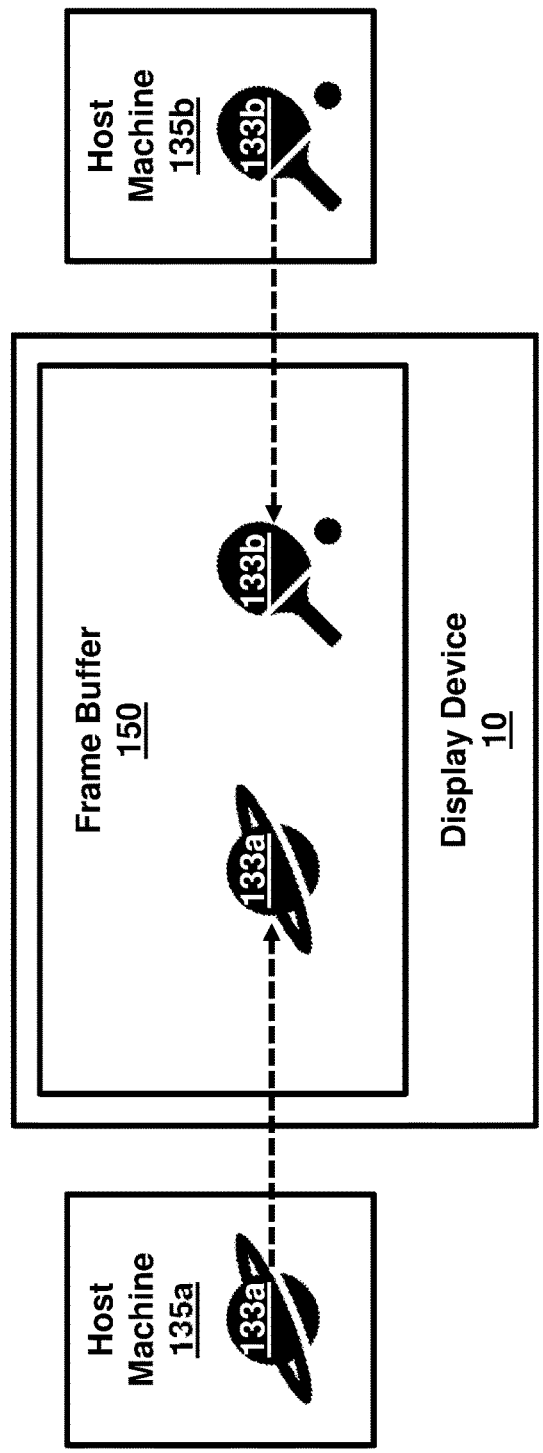
FIG. 8 is a block diagram illustrating a frame buffer of a display device, according to an example.

FIG. 8, with reference to FIGS. 1 through 7, is a block diagram illustrating a frame buffer 150 of the display device 10, according to an example. Accordingly, the display device 10 may include a frame buffer 150 to store the graphics 133a, 133b from the multiple host machines 135a, 135b. In an example, the frame buffer 150 may be part of the memory 105 and includes a bitmap of the graphics 133a, 133b for output 125 on the display device 10. Moreover, the frame buffer 150 may contain the complete frames making up a video, in examples where the graphics 133a, 133b contain video. In another example, the frame buffer 150 may be embedded in the display device 10. As such, the graphics 133a, 133b that are stored in the frame buffer 150 are used for output 125 on the display device 10. Examples of the output 125 are described below.

FIG. 9, with reference to FIGS. 1 through 8, is a block diagram illustrating two output displays 120a-120b associated with a split screen output, according to an example. More particularly, FIG. 9 is a block diagram illustrating an example where the split screen output mode 120 includes at least two output displays 120a-120b; e.g., a dual display, to display the graphics 133a, 133b. For example, the output 125 as described above with reference to FIG. 8 may be presented as two output displays 120a-120b on the display device 10. FIG. 10, with reference to FIGS. 1 through 9, is a block diagram illustrating four output displays 120a-120d associated with a split screen output, according to an example. More specifically, FIG. 10 is a block diagram illustrating an example where the split screen output mode 120 includes four output displays 120a-120d; e.g., a quad display, to display the graphics 133a-133d. For example, the output 125 as described above with reference to FIG. 8 may be presented as four output displays 120a-120d on the display device 10.

The graphics 133a-133d may be any type of graphics including images and videos, and the representations of the graphics 133a-133d provided in the figures are merely example representations of graphics and are not limited to any particular type of graphics. Furthermore, the output displays 120a-120b in FIG. 9 may be arranged as picture-in-picture or picture-by-picture formats, and may be uniformly sized or have different sizes; e.g., display 120a and 120b may be the same size or may be different sizes with respect to one another. Similarly, some of the output displays 120a-120d in FIG. 10 may be arranged as picture-in-picture or picture-by-picture formats, and may be uniformly sized or have different sizes; e.g., display 120a-120d may be the same size or may be different sizes with respect to one another. Additionally, the split screen output mode 120 may include any number of output displays in addition to the ones shown and described with reference to FIGS. 9 and 10.

Figure 11:
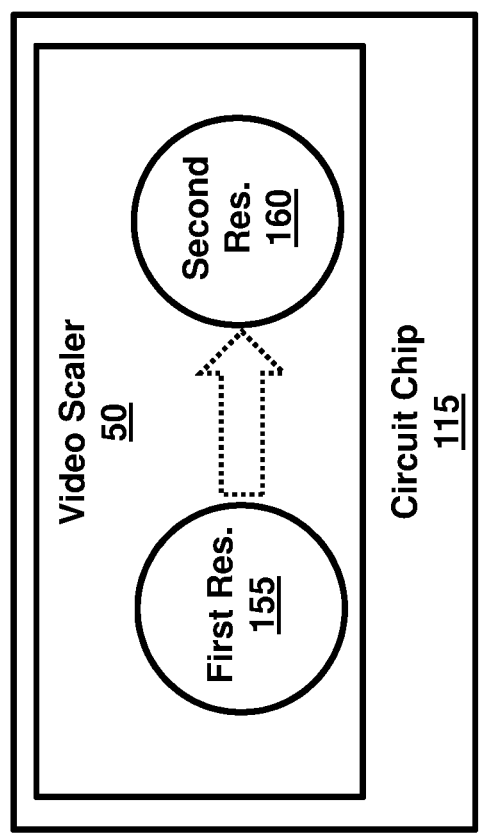
FIG. 11 is a block diagram illustrating a video scaler to convert a display resolution of a split screen output for display, according to an example.

FIG. 11, with reference to FIGS. 1 through 10, is a block diagram illustrating a video scaler 50 to convert a display resolution 155 of a split screen output for display, according to an example. According to an example, the circuit chip 115 includes a video scaler 50 to convert a first display resolution 155 into a second display resolution 160. As described above, the video scaler 50 may be a digital device or a combined analog and digital device, and in an example, the video scaler 50 may be a hardware-enabled device that converts the first display resolution 155 associated with the graphics 133a, 133b provided by the host machines 135a, 135b, respectively, to a second display resolution 160 in order to be formatted for the split screen output mode 120 using standard conversion or scaling techniques for output 125 on the display device 10. In examples, the first display resolution 155 and the second display resolution 160 are different from one another. For example, the first display resolution 155 may be a half-screen resolution, and the second display resolution 160 may be a full-screen resolution for the display device 10.

Various examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device.

Figure 12:
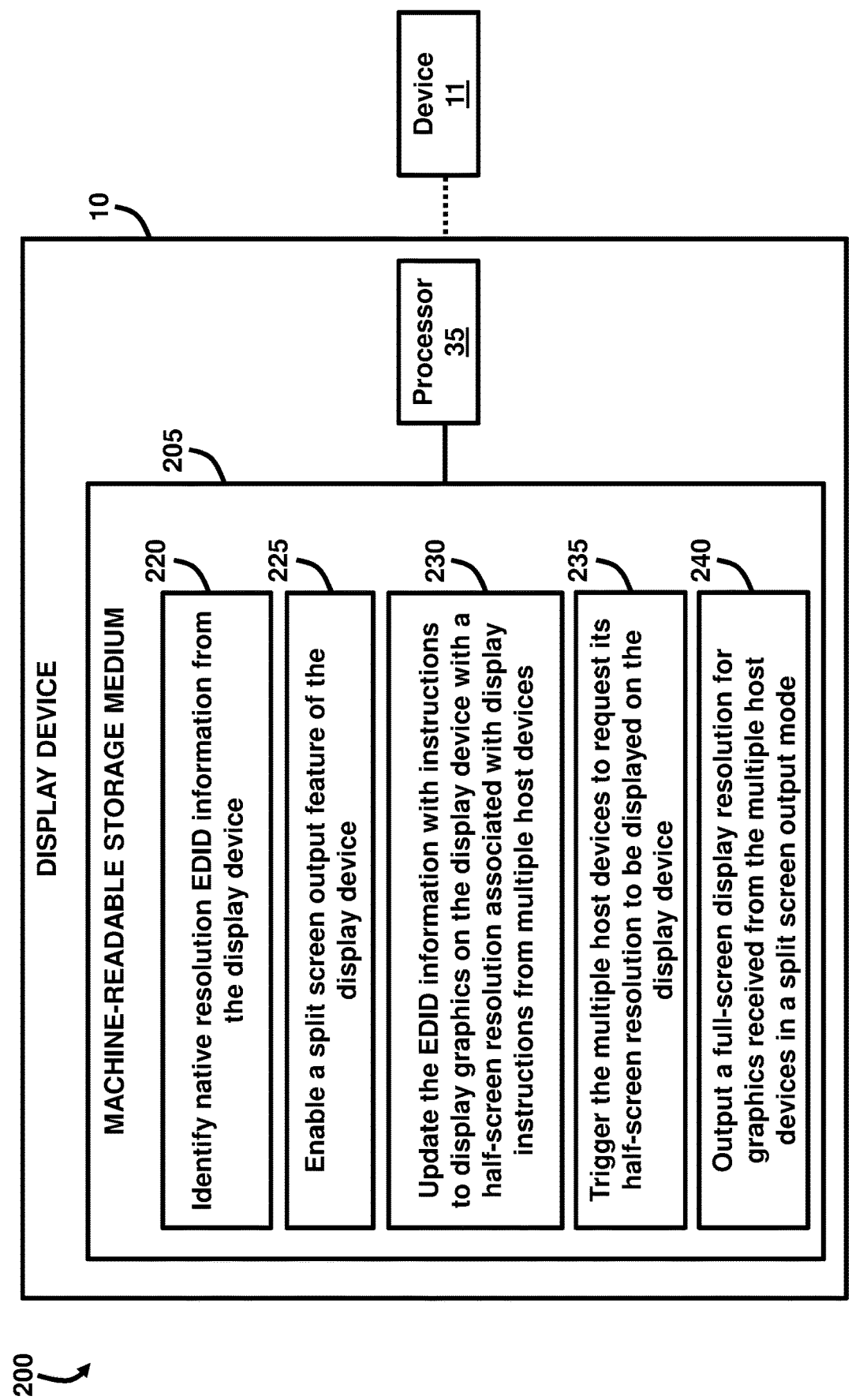
FIG. 12 is a block diagram illustrating a system to display graphics, according to an example.

FIG. 12, with reference to FIGS. 1 through 11, is a block diagram illustrating a system 200 to display graphics 133a, 133b, according to an example. In the example of FIG. 12, the display device 10 includes a processor 35 and a machine-readable storage medium 205. Processor 35 may include a central processing unit, microprocessors, hardware engines, circuit chip 115, and/or other hardware devices suitable for retrieval and execution of instructions stored in a machine-readable storage medium 205. Processor 35 may fetch, decode, and execute computer-executable instructions 220, 225, 230, 235, and 240 to enable execution of locally-hosted or remotely-hosted applications for controlling action of the display device 10. The remotely-hosted applications may be accessible on one or more remotely-located devices; for example, device 11. For example, the device 11 may be a computer, tablet, smartphone, or remote server. As an alternative or in addition to retrieving and executing instructions, processor 35 may include one or more electronic circuits including a number of electronic components for performing the functionality of one or more of the instructions 220, 225, 230, 235, and 240.

The machine-readable storage medium 205 may be any electronic, magnetic, optical, or other physical storage device that stores executable instructions. Thus, the machine-readable storage medium 205 may be, for example, Random Access Memory (RAM), an EPROM, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 205 may include a non-transitory computer-readable storage medium. The machine-readable storage medium 205 may be encoded with executable instructions for enabling execution of remotely-hosted applications accessed on the one or more remotely-located devices 11.

In an example, the processor 35 of the display device 10 executes the computer-executable instructions 220, 225, 230, 235, and 240. For example, computer-executable identifying instructions 220 may identify native resolution EDID information 40a, 40b from the display device 10. In this regard, the native resolution EDID information 40a, 40b is associated with the display device 10 prior to any altering, processing, or reformatting, according to an example. The native resolution EDID information 40a, 40b may be pre-set by the display device 10 in one example. Alternatively, the native resolution EDID information 40a, 40b may be based on the most-recent updates or changes to the EDID information 40a, 40b associated with the display device 10. In some examples, the EDID information 40a, 40b includes resolution data, refresh rate data, and display mode data associated with the graphics 133a, 133b.

In an example, computer-executable enabling instructions 225 may enable a split screen output feature; e.g., split screen output 120, of the display device 10. In this regard, the processor 35 may determine whether the split screen output feature is generated and provided to the display device 10 and provide an operational or activation command, etc. to provide the split screen output 120 to the display device 10. Accordingly, once the processor 35 processes the computer-executable enabling instructions 225, the split screen output feature is selected; i.e., enabled, for the display device 10.

According to an example, computer-executable updating instructions 230 may update the EDID information 40a, 40b with instructions to display graphics 133a, 133b on the display device 10 with a half-screen resolution 140 associated with display instructions from multiple host machines 135a, 135b. In regard to the updating process, the processor 35 may change the EDID information 40a, 40b into EDID information 40aa, 40bb. Moreover, the EDID information 40a, 40b as well as the changed EDID information 40aa, 40bb may include a variety of parameters or specifications that are supported by the display device 10. Some example specifications included in the EDID information 40a, 40b and the changed EDID information 40aa, 40bb are product name and type, display size, and supported timing modes. The EDID information 40a, 40b may be read, processed, and edited by the processor 35, according to an example. In some examples, the processor 35 changes the EDID information 40a, 40b into EDID information 40aa, 40bb by changing the resolution data, refresh rate data, and/or display mode data associated with the display device 10.

In this regard, the processor 35 utilizes up-conversion, down-conversion, upscaling, and downscaling techniques to change the resolution of the graphics 133a, 133b provided by the multiple host machines 135a, 135b, respectively. Accordingly, in one example, the graphics 133a, 133b provided by the host machines 135a, 135b, respectively may be set to full-screen display resolution 110, and by changing the EDID information 40aa, 40bb, the processor 35 is provided to change the resolution of the graphics 133a, 133b to be displayed on the display device 10 to a half-screen display resolution 140; i.e., for display on the multiple output displays 120a, 120b of the display device 10.

The host machines 135a, 135b may be desktop computers, laptop computers, servers, tablet devices, smartphones, television channel receivers, digital cameras, video cameras, video sensors, scanners, or other types of electronic devices that generate graphics 133a, 133b, respectively, and may be the same type of electronic device or may be different types of electronic devices compared to one another.

In an example, computer-executable triggering instructions 235 may trigger the multiple host machines 135a, 135b to request the half-screen resolution 140 to be displayed on the display device 10. According to an example, the triggering process may include the processor 35 providing an operational or activation command, etc. to the operatively connected multiple host machines 135a, 135b in order for the multiple host machines 135a, 135b to generate a request that the half-screen resolution 140 provided by the respective multiple host machines 135a, 135b be displayed on the display device 10.

Computer-executable outputting instructions 240 may output 125 a full-screen display resolution 110 for graphics 133a, 133b received from the multiple host machines 135a, 135b in a split screen output mode 120, according to an example. Here, once the half-screen resolution 140 request is generated by the multiple host machines 135a, 135b, since the EDID information 40a, 40b has previously been updated to changed EDID information 40aa, 40bb, the processor 35 identifies that the graphics 133a, 133b received from the multiple host machines 135a, 135b should be displayed on the display device 10 in a full-screen display resolution 110 rather than a half-screen resolution 140 in order to remove unused display areas 75 from appearing on the display device 10.

In an example, the computer-executable instructions 220, 225, 230, 235, and 240, when executed, may further cause the processor 35 to process a split screen output command 45. In some examples, the split screen output command 45 includes any of a picture-in-picture output command 145a and a picture-by-picture output command 145b. Moreover, the computer-executable instructions 220, 225, 230, 235, and 240, when executed, further cause the processor 35 to display a full-screen display resolution 110 for each of the graphics 133a, 133b received from the multiple host machines 135a, 135b in the split screen output mode 120 without a reduced graphics quality compared with a quality of the graphics received from the multiple host machines 135a, 135b, according to some examples. In this regard, the processor 35 is able to achieve data integrity for the graphics 133a, 133b without degradation of the quality of the graphics 133a, 133b from its original form on the host machines 135a, 135b, respectively, to being output on the display device 10.

The examples described herein provide a technique to allow different host machines 135a, 135b input graphics 133a, 133b into a display device 10 to permit multi-mode display of the graphics 133a, 133b by the display device 10 by changing the EDID information 40aa, 40bb associated with the graphics 133a, 133b prior to displaying the graphics 133a, 133b onto the display device 10. The aspect ratio 70a, 70b associated with the graphics data 65a, 65b of the graphics 133a, 133b, respectively may be altered to aspect ratio 70x, 70y, respectively to change the resolution of the graphics 133a, 133b that are to be displayed on the display device 10. The resulting a split screen output mode 120 eliminates unused display areas 75 from appearing on the display device 10 to provide an enhanced user experience for viewing graphics 133a, 133b in a multi-output display setting.

The present disclosure has been shown and described with reference to the foregoing exemplary implementations.

Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A display device comprising:
a first graphics input port to receive a first video signal;
a second graphics input port to receive a second video signal;
a processor to select extended display identification data (EDID) information associated with the display device, and change the EDID information of a full-screen resolution of the first and second video signals while a split screen output command is generated by the processor;
a video scaler to generate a split screen output with a full-screen display for both the first and second video signals based on the changed EDID information; and
a frame buffer to store the first video signal and the second video signal received from multiple host machines,
wherein the first and second video signals comprise graphics data, and wherein the video scaler is to scale the graphics data received by each of the first and second graphics input ports by changing an aspect ratio associated with the graphics data, and
wherein the full-screen display for both the first and second video signals based on the changed EDID information removes unused display areas from the split screen output.

2. The display device of claim 1, wherein the changed EDID information comprises half-screen resolution information.

3. The display device of claim 1, wherein the first graphics input port is to receive the first video signal from a first machine, and wherein the second graphics input port is to receive the second video signal from a second machine that is different from the first machine.

4. A system comprising:
a memory to store extended display identification data (EDID) information associated with a display device, wherein the EDID information comprises capabilities for the display device to display graphics at a full-screen display resolution;
a circuit chip to:
enter into a split screen output mode for the display device to split an output into multiple output displays based on graphics received from multiple host machines;
change the EDID information from a full-screen display resolution to a half-screen display resolution while in the split screen output mode when a split screen output command is generated by the circuit chip; and
generate the split screen output mode associated with graphics from the multiple host machines with a full-screen display resolution based on the changed EDID information;
a video scaler of the display device to generate a split screen output with a full-screen display resolution, wherein the video scaler is to scale the graphics by changing an aspect ratio associated with the graphics; and
a frame buffer to store the graphics from the multiple host machines,
wherein the full-screen display resolution based on the changed EDID information removes unused display areas from the split screen output mode.

5. The system of claim 4, wherein the memory comprises any of a read-only memory and a flash memory.

6. The system of claim 4, wherein the split screen output mode comprises at least two output displays.

7. The system of claim 4, wherein the split screen output mode comprises four output displays.

8. The system of claim 4, wherein the circuit chip comprises a video scaler to convert a first display resolution into a second display resolution.

9. A non-transitory machine-readable storage medium comprising computer-executable instructions that when executed cause a processor of a display device to:
identify native resolution extended display identification data (EDID) information from the display device;
enable a split screen output feature of the display device;
update the EDID information with instructions to display graphics on the display device with a half-screen resolution associated with display instructions from multiple host machines;
trigger the multiple host machines to request the half-screen resolution to be displayed on the display device;
generate a split screen output with a full-screen display resolution on the display device using a video scaler of the display device upon receiving a split screen output command that is generated by the processor;
scale the graphics by changing an aspect ratio associated with the graphics;
store the graphics from the multiple host machines in a frame buffer; and
output a full-screen display resolution for graphics received from the multiple host machines in a split screen output mode,
wherein the full-screen display resolution based on updated EDID information removes unused display areas from the split screen output mode.

10. The non-transitory machine-readable storage medium of claim 9, wherein the EDID information comprises resolution data, refresh rate data, and display mode data associated with the graphics.

11. The non-transitory machine-readable storage medium of claim 9, wherein the computer-executable instructions, when executed, further cause the processor to process a split screen output command, wherein the split screen output command comprises any of a picture-in-picture output command and a picture-by-picture output command.

12. The non-transitory machine-readable storage medium of claim 9, wherein the computer-executable instructions, when executed, further cause the processor to display a full-screen display resolution for each of the graphics received from the multiple host machines in the split screen output mode without a reduced graphics quality compared with a quality of the graphics received from the multiple host machines.

13. The display device of claim 1, wherein the video scaler is to process the first video signal and the second video signal simultaneously when received by each of the first and second graphics input ports.

14. The display device of claim 1, wherein the video scaler is to process the first video signal and the second video signal non-simultaneously when received by each of the first and second graphics input ports.

15. The system of claim 4, wherein the video scaler is to process a first video signal and a second video signal from the multiple host machines, respectively.

16. The system device of claim 15, wherein the video scaler is to process the first video signal and the second video signal simultaneously.

17. The system of claim 15, wherein the video scaler is to process the first video signal and the second video signal non-simultaneously.

18. The non-transitory machine-readable storage medium of claim 9, wherein the computer-executable instructions, when executed, further cause the processor to cause the video scaler to process a first video signal and a second video signal from the multiple host machines, respectively.

19. The non-transitory machine-readable storage medium of claim 18, wherein the computer-executable instructions, when executed, further cause the processor to cause the video scaler to process the first video signal and the second video signal simultaneously.

20. The non-transitory machine-readable storage medium of claim 18, wherein the computer-executable instructions, when executed, further cause the processor to cause the video scaler to process the first video signal and the second video signal non-simultaneously.

\* \* \* \* \*